Patented June 13, 1933

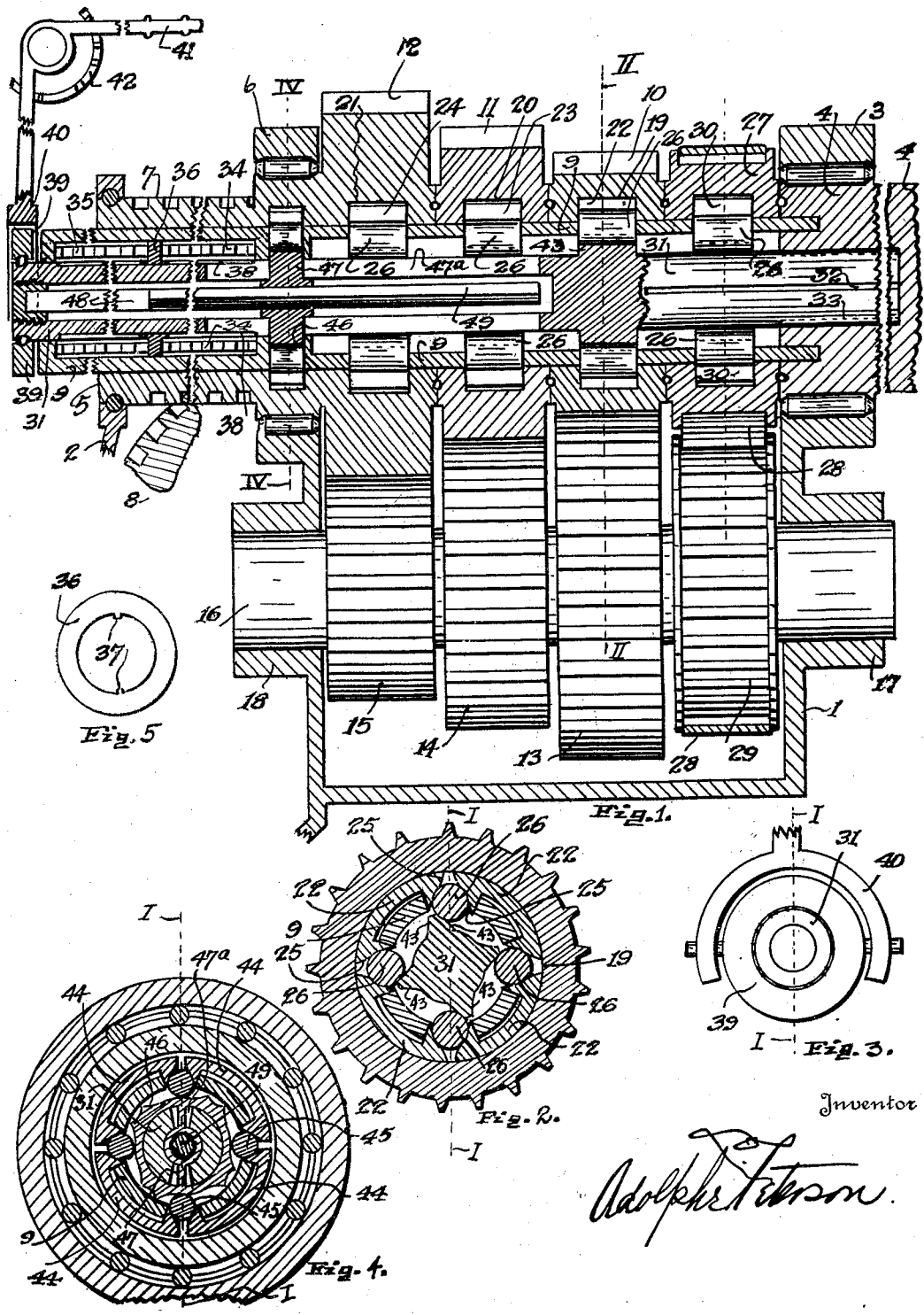

1,913,949

UNITED STATES PATENT OFFICE

ADOLPHE C. PETERSON, OF MINNEAPOLIS, MINNESOTA

MANUALLY SELECTIVE POWER ACTUATED BAND GEAR CHANGE MEANS

Application filed December 6, 1928. Serial No. 324,298.

My invention relates to variable gear devices and particularly to a device having certain characteristics wherefore it is called a manually selective power actuated band gear change means.

The principal objects of my invention are to provide a gear changing means which shall be simple in operation, simple in control, simple in construction and durable in operation while at the same time having certain other characteristics. A principal object is to provide a gear changing means which shall be of such character that it may be operated without any particular care in the control and without any regard for the speed of the vehicle or the direction of motion or the speed of the engine or car with relation to the engine. A principal object of the invention is to provide a gear change means which shall provide such gear changing facility that it may be readily operated by any unskilled person and under any circumstances of operation without any difficulty usually attendant upon gear changing. A principal object is to provide a power actuated gear changing means which shall be very simple in operation and construction and which shall be readily operated and be selective in its control. In general the object is to provide a gear changing means which shall be an improvement in several features over the usual form of gear changing devices.

The principal devices and combination of devices constituting my invention are as hereinafter described and as defined in the claims.

In the accompanying drawing which illustrates my invention like characters refer to like parts throughout the several views.

Referring to the drawing:

Figure 1 is a view chiefly in vertical section through the axial centers of the principal operating shafts of my device, this view being taken on the line I—I of Figures 2, 3, 4.

Figure 2 is a view in partial section on the line II—II of Figure 1 this section being taken on the plane at right angles to that of Figure 1 and showing only the section through the clutched gear with the coacting gear being omitted.

Figure 3 is an end view from the left of Figure 1 showing the control yoke.

Figure 4 is a vertical section at right angles to that of Figure 1 on the line IV—IV of Figure 1.

Figure 5 is a detail view showing the key ring 36 as it appears looking from the left of Figure 1.

Referring again to the drawing, the numeral 1 indicates a gear case of the usual type wherein the principal operating parts of my device are trunnioned or supported in bearings. The numeral 2 indicates a partial broken away section of a differential case of a front axle to which my device is related. It is contemplated that my device will be principally used in conjunction with front axle drive means and it is therefore shown in this connection but it is also contemplated that the device may be used with any drive means as a rear axle driving means. The gear case 1 has supported therein at its rear end in a bearing 3 a drive shaft 4 which drive shaft 4 is intended to be in cooperative relation with and driven with or by an internal combustion engine (not shown) through the medium of the usual form of friction main clutch, this also not being shown, since it is contemplated that any form of clutch and engine may be used as the driving motor upon the drive shaft 4. The drive shaft 4 is in axial alignment with a driven shaft 5 which latter is revolvably mounted at the front end of the gear case by means of a roller bearing 6 and which bears at its extreme front end a worm 7. The worm 7 is adapted to drive a worm wheel 8 and the latter worm wheel is contemplated to be attached to and to drive a differential casing and flexible axle drive shafts which transmit the drive to automobile wheels, the differential casing, flexible axle shafts and wheels not being shown as there is no restriction intended upon the method of this drive from the worm 7 to the automobile wheels.

The drive shaft 4 and the driven shaft 5 have revolvably mounted within them as bearings, at its front and rear ends, a main shaft 9. The main shaft 9 is tubular and is adapted to serve as a bearing mounting for two spur gears 10 and 11 which have relatively wide faces. A third spur gear 12 is secured to and revolves with the driven shaft 5. The spur gears 10 and 11 are free to revolve upon the main shaft 9 except when clutched thereto by the means hereinafter described. The spur gear 10 is in constant mesh with the spur gear 13, the spur gear 11 with a spur gear 14, and the spur gear 12 with a spur gear 15. The spur gears 13, 14, 15 are secured to and revolve with a secondary shaft 16 and they may be integrally constructed therewith. The secondary shaft is mounted revolvably in the gear case 1 by means of bearings 17, 18.

The spur gears 10, 11, 12 each have internally clutch faces 19, 20, 21 which are as wide as may be considering the width of the spur gear and its mounting. These clutch faces 19, 20, 21 are formed as cylindrical recesses in the internal bore of the spur gears as shown and they are so deep radially that they will accommodate the so-called clutch hereafter described. The spur gears 10, 11, 12 have related with them clutch brakes 22, 23, 24 respectively which are located in the respective clutch face recesses of the spur gears. Each clutch brake 22, 23 or 24 is composed of four arc-like parts as shown and each of these have radially internally extending inclined ends 25. These inclined ends are so inclined and so placed relatively to each other in openings in the main shaft 9 that between the adjacent inclined ends 25 of the adjacent ends of the clutch brake parts there is a wedge or pyramid shaped space wherein there is located a related roller 26. There is one roller between each adjacent pair of inclined ends and there are therefore four rollers 26 for each clutch brake and these four rollers of one clutch brake related to one spur gear 10, 11, or 12 all lie in the same plane transversely of the axis of the main shaft 9 and therefore lie in the plane of revolution of the related spur gear. The four parts of each clutch brake are so related to its rollers that when the rollers thereof are extended radially they will force the four parts of the clutch brake radially outward against the internal clutch face of the related spur gear so that such radial extension of the rollers of any clutch brake will therefore cause the clutch brake to come into tight friction connection with the clutch face of the spur gear and therefore clutch the spur gear to the main shaft, since the rollers are in the main shaft or opening therein and the clutch brakes have their inclined ends lying in the openings of the main shaft 9.

There are therefore three sets of rollers lying in three transverse planes. There is also one other set of rollers 26 which are in the rotative plane of a sprocket gear 27 which is rotatably mounted on the main shaft 9 as a bearing in a similar manner to the mounting of the spur gears 10, 11, 12 and this sprocket gear 27 through a sprocket chain 28 may drive a sprocket gear 29 secured upon the secondary shaft 16. These sprocket gears and their chain provide for reverse driving when the sprocket gear 27 is engaged to the main shaft 9. Clutch 30 is related to rollers of gear 27.

The four sets of rollers 26, each set being adapted to drive its related spur gear or sprocket gear 27 by means of its related clutch brake, have related to them a cam shaft 31 which is rotatively mounted at its front end in the driven shaft 5 as a bearing and at its rear end in the drive shaft 4 as a bearing. The cam shaft 31 at its rear end is round but has key-ways 32 parallel to the axis of the cam shaft wherein keys formed internally in drive shaft 4 and denoted by 33 may slide and may drive the cam shaft with the drive shaft 4 but at the same time permit axial movement of the cam shaft relatively to the drive shaft 4. The bore in the drive shaft and length of the cam shaft are such as to permit this in the requisite manner. The front end of the cam shaft 31 is slidable in the front end of the main shaft 9 but is not secured there to the main shaft except, yieldably through the medium of two spiral springs 34, 35 which are each connected or secured at one remote end to the main shaft internally and at the ends adjacent to each other are secured to a so-called key-ring 36. The key ring 36 has keys which are slidable in keyways 38 in the cam shaft face so that the cam shaft is therefore slidable axially but still restrained from relative rotation to the main shaft 9 by means of the two spiral springs 34, 35 which are so located and in such tension that they will always tend to return the cam shaft to a normal mid-position rotationally whenever the cam shaft is forcibly rotated from that position either way and then released.

The cam shaft is thus rotationally fixed at its rear end to the drive shaft 4 and at its front end has only a few degrees rotation either way from a normal position relative to main shaft 9 and is always returned to this normal position rotationally when the drive shaft 4 is released from the torque of the driving engine and main clutch not shown. The cam shaft at its extreme front end has a ball bearing 39 mounted on it by means of which a control yoke 40 may move the cam shaft axially. The control yoke may be stationed by means of control lever 41 and its sector 42.

The rollers 26 of each set or the several sets are preferably so distantly located axially apart, the spur gears being so formed or stationed, that there is a space about the equivalent of the length of a roller between the rollers of the several sets, axially. The cam shaft 31 has formed integrally with it or constructed with it four cam lobes 43 which normally lie, when the cam shaft is normally located revolvably to the main shaft, in the lines parallel to the axis which lie between the lines of the rollers. The rollers of all the sets lie in four parallel lines axially. Whenever the cam lobes are moved rotationally out of this normal position by the rotation of the cam shaft 31 against the tension of springs 34, 35 by the torque of the engine, the cam lobes will (if stationed in the plane transversely of a set of rollers) engage those rollers selected and extend them radially outwardly so that they thereby force the inclined ends of the selected clutch outwardly and the clutch against its related clutch face. Whenever the cam shaft is released from the engine torque the cam lobes are returned to their normal position by the action of the springs 34, 35.

The main shaft 9 has also a smaller clutch brake 44 similar to the others, but smaller, similarly having its inclined ends located in openings in the main shaft, and stationed in the transverse plane of the spur gear 12 or its attached driven shaft 5 so that extension of its rollers 45 radially outward will by friction engage the driven shaft 5 with only slight friction engagement to the main shaft 9. This engagement is effected whenever the cam shaft 31 is returned to its normal position rotationally by the action of the springs 34, 35 and is only of such strength or force that it will serve to retard the main shaft against torque of the engine upon the cam shaft until the cam lobes 43 engage the rollers selected and thereby a selected spur gear. The arms of brake 44 may have a flexible spring character for gradual engagement. A secondary cam ring 46 is always located in the plane of the rollers 45 and is rotated with the cam shaft by means of a diametral bar 47 in slots 47a in the cam shaft 31. The cam ring 46 has its cam face of such form that it will cause slight frictional engagement of the clutch brake 44 to the driven shaft 5 but so that it will be released as soon as a selected spur gear is engaged by cam lobes 43. The cam shaft has one end of an internal ribbon spring 48 secured to it internally and the other end of this is secured to a square rod 49 which slides in a square hole in the diametral bar 47, the square rod thereby sliding with the cam shaft axially and having such rotational torsion resistance that it will permit a very slight rotation relatively of the cam ring 46. The construction is such, however, that the relative rotation of the cam ring 46 is limited by the impingement of the diametral bar 47 against the sides of the slots 47a.

The slight yieldable rotation of the cam ring relatively will permit slight retardment of the disengagement of the clutch brake 44 but will not prevent full disengagement of this clutch brake 44 when the cam lobes 43 have engaged firmly a selected clutch brake and spur gear 10, 11, 12. That is, the devices must be so related that there is slight engagement of the selected spur gear 10, 11, 12 by slight frictional engagement of its clutch before the clutch brake 44 is disengaged and that there then becomes firm engagement of the spur gear 10, 11, or 12 as the clutch brake 44 is fully disengaged. The devices may however be so constructed that one fully disengages before the other engages and the force of rotation be depended upon to engage the selected clutch brake and spur gear, it being noted that the centrifugal force and gravitational forces upon the clutch brakes and rollers will assist in causing a sufficient frictional engagement of any clutch 22, 23, 24, or 30 so that this will be sufficient as an initial frictional engagement to compel the full engagement of the selected spur gear on the rotation relatively by torque upon the cam shaft 31. It is noted that the action whereby any selected clutch brake is engaged with its related spur gear is cumulative so that as the driving force of engagement through the cam lobes 43 accumulates the frictional resistance to rotation accumulates also and would permit the full engagement or cause it even though the clutch brake 44 were omitted. The clutch brake 44 is preferably included however or any other means for the same purpose may be included in the construction. The cam shaft 31 in the construction shown always has the slight frictional engagement with the driven shaft through its clutch brake 44 when the cam shaft is in the normal position. The clutch brakes 22, 23, 24 and 30 should be so accurately fitted and the inclinations of the inclined ends 25 and of the cam lobes 43 should be such as to readily induce the accumulative pressure engagement as between a selected clutch brake and its related spur gear upon the imposition of light rotative force relatively as between the cam shaft 31 and the main shaft 9. This should be the condition particularly in construction omitting the clutch brake 44.

In the operation an engine through its main clutch may be engaged or disengaged with the drive shaft 4 and whenever disengaged the operator may axially move the cam shaft with its cam lobes to a selected position for engagement of spur gear 10, 11, 12 or the sprocket gear and thus either reverse, low, intermediate or direct speed is engaged. Reengagement of the main clutch causes the cam shaft to be rotated against the tension of the springs 34, 35 to engage the cam lobes against the rollers selected and thus to thrust the friction clutch selected against the internal face of the selected spur or sprocket gear. Disengagement of the main clutch always causes return of the cam shaft to the normal position by the springs 34, 35, and thus the cam lobes are normally positioned so that they move in a line between the axial lines of rollers when the cam shaft is shifted axially by the control lever. It is to be noted that the cam lobes may have between them slight radial extended elevations on the cam shaft which have inclined approaches and will cause slight radial extension of each set of rollers as they are moved between the rollers of a set, so that this may thus be relied on to cause the slight initial engagement. The keyways and slots are not of such width as to interfere with the positioning of the rollers by the round circumference of the cam shaft.

While I have shown particular devices and combinations of devices in the illustration of my invention I contemplate that other devices and combinations of devices may be used in the realization of my invention without departing from the spirit and contemplation thereof.

While I have shown particular devices and combinations of devices in the illustration and description of my invention I contemplate that other detailed devices and combinations of devices may be used in the realization of my invention without departing from the spirit and contemplation thereof.

What I claim is:

1. In a transmission means, a drive element and a driven element, transmission sets each adapted to transmit drive between the drive and driven elements, independent clutching elements radially extensible and each related to one element of a transmission set, a control element adapted to be given torque by the drive element and by relative rotation to engage any of the clutching elements with its related element of a transmission set and means for locating the control element with relation to the clutching elements.

2. In a transmission means, a drive element and a driven element, transmission sets each adapted to transmit drive between the drive and driven elements, independent frictional clutching elements adapted each to engage a related element of a transmission set by friction, pressure applying elements related one to each frictional clutching element and adapted to apply the friction element to engage its related transmission element, and a control element, comprising a cam element internally of the friction elements and torque applying means for imparting torque of the driving train and a selector means whereby the cam element is effective upon a selected one of the transmission sets by its frictional clutching elements.

3. In a transmission means, a drive element and a driven element, transmission sets each adapted to transmit drive between the drive and driven elements, independent frictional clutching elements adapted each to engage a related element of a transmission set by friction, pressure applying elements related one to each frictional clutching element, and adapted to apply the friction element to engage its related transmission element, and a power actuated means for applying the friction elements, comprising a torque element adaptable to impart torque from the driving train to a selected pressure applying element and a selector means whereby the torque element is effective upon a selected one of the transmission sets by its frictional clutching element.

4. In a transmission means, a drive element and a driven element, transmission sets each adapted to transmit drive between the drive and driven elements, independent frictional clutching elements adapted each to engage a related element of a transmission set, radially extensible pressure applying means related one to each frictional clutching element and adapted to apply the friction element to engage its related transmission element, and a torque element adapted to be relatively rotated by the drive element and a selector means whereby the torque element is effective upon a selected one of the transmission sets by its clutching friction element and to thereby control the pressure applying means.

5. In a transmission means, a drive element and a driven element, transmission sets each adapted to form driving engagement between the drive and driven elements, a friction engaging element adapted to apply friction engagement to any of the transmission elements, means for causing the friction engaging element to be applied and means for controlling the application, comprising a selector means movable axially of the friction engaging elements to selecting positions, and a control means yieldably placing the selector means normally to the applying means.

6. In a transmission means, a drive element and a driven element, transmission sets each adapted to form driving engagement between the drive and driven element and having each frictional engagement element, a frictional member adapted to engage a transmission element by its frictional engagement element to one of the drive or driven elements, and means for controlling the engagement, comprising a selector means movable axially of the frictional engaging elements to selecting positions and a control means placing the selector means yieldably in a normal position and adapted to move the selector means to a selecting position.

7. In a transmission means, a drive element and a driven element, transmission sets each adapted to form driving engagement between the drive and driven elements, and having each a frictional engagement surface related to it, friction applying means adapted to be engaged with either of the frictional engagement surfaces by power actuated pressure application means, and control means, comprising a selector means yieldably held in a normal position and displaceable to a selecting position for engagement of the pressure application means.

8. In a transmission means, a drive element and a driven element, transmission sets each adapted to form driving engagement between the drive and driven elements, and having each a frictional engagement surface related to it, a friction applying means adapted to be engaged with either of the frictional engagement surfaces by radially extensible elements, and torque actuated means adapted to radially extend the extensible elements, comprising a torque element adapted to receive torque in the driving train, having a structure for imparting movement to the extensible elements as selected.

9. In a transmission means, a drive element and a driven element, transmission sets each adapted to form driving engagement between the drive and driven elements, and having each a frictional engagement surface related to it, a friction applying means adapted to be engaged with either of the frictional engagement surfaces by radially extensible elements each related to a frictional engagement surface, a torque actuated pressure applying means having a structure for imparting movement to the radially extensible elements and adapted to be moved axially of the frictional surfaces to positions related to control of either of the frictional applying means.

10. In a transmission means, a drive element and a driven element, transmission sets each adapted to form driving engagement between the drive and driven element and having each a frictional engagement surface related to it, a friction applying means adapted to be engaged with either of the frictional engagement surfaces by radially extensible elements each related to a frictional engagement surface, a torque actuated pressure applying means having a structure for imparting movement to the radially extensible elements, and adapted to be moved axially of the frictional surfaces to positions related to control of either of the frictional applying means, and a relativity control means yieldably holding the pressure applying means in a normal position and adapted to place the pressure applying means in an applying position.

11. In a transmission means, a drive element and a driven element, transmission sets each adapted to form driving engagement between the drive and driven elements, and having each a frictional engagement surface related to it, a friction applying means adapted to be engaged with either of the frictional engagement surfaces by radially extensible elements each related to a frictional engagement surface, a torque actuated pressure applying means having a structure for imparting movement to the radially extensible elements and adapted to be moved axially of the frictional surfaces to positions related to control of either of the frictional applying means, and supplementary clutching means for interposition of torque during inaction of the frictional applying means.

12. In a transmission means, a drive element and a driven element, transmission sets each adapted to form driving engagement between the drive and driven elements and having each a frictional engagement surface related to it, a torque element adapted to have rotational torque of drive through the transmission impressed upon it, friction-engagement means adapted to engage frictionally with either of the friction engagement surfaces, a carrier supporting pressure application means, yieldable means yieldably locating the carrier rotationally of the torque element, means whereby rotational torque upon the torque element exerts application pressure on the frictional engagement means through the pressure application means, and means controlling selectively the application of torque thereby from the torque element to a selected frictional engagement surface.

13. In a transmission means, a drive shaft and a driven shaft, a torque element rotationally joined with one of the shafts, transmission sets each adapted to transmit drive between the drive and the driven shafts, a frictional engagement surface associated with each transmission set, a carrier supporting frictional engagement means and pressure application means in units each related to a frictional engagement surface, means whereby the torque element is shiftable axially for selection of engagement with the pressure application means, and means incorporated with the torque element whereby rotational torque upon the torque element exerts application pressure on the frictional engagement means selected by its pressure application means.

14. In a transmission means, a drive element and a driven element, transmission sets each adapted to form driving engagement between the drive and driven elements and having each a frictional engagement surface related to it, a torque element adapted to have rotational torque of drive through the transmission impressed upon it, friction engagement means adapted to engage frictionally with either of the friction engagement surfaces, a carrier supporting pressure application means, yieldable means yieldably locating the carrier rotationally of the torque element, and means whereby rotational torque upon the torque element exerts application pressure on the frictional engagement means through the pressure application means.

15. In a transmission means, a drive and a driven element, transmission sets each adapted to form driving engagement between the drive and driven elements and having each a frictional engagement surface related to it, a torque element adapted to have rotational torque of drive through the transmission impressed upon it, friction engagement units each adapted to engage frictionally with one of the frictional engagement surfaces and each having related pressure application means, a carrier supporting the friction engagement units and their related pressure application means, and means whereby rotational torque upon the torque element in accordance with a control is exerted through a pressure application means to frictionally engage the related friction engagement unit with its related frictional engagement surface and transmission set.

16. In a transmission means, a drive element and a driven element, a transmission set comprising a pair of gears adapted to form driving engagement between the drive element and the driven element and having one of the gears rotationally joined with one of the drive and driven elements and the other of the gears having a frictional engagement surface joined with it, a torque element adapted to have rotational torque of drive through the transmission impressed upon it, a friction engagement unit adapted to engage frictionally with the frictional engagement surface and having related a pressure application means, a carrier supporting the friction engagement unit and its related pressure application means, and means whereby rotational torque upon the torque element is exerted through the pressure application means to frictionally engage the friction engagement unit with the frictional engagement surface and its joined gear.

17. In a transmission means, a drive element and a driven element, a transmission set comprising a pair of gears adapted to form driving engagement between the drive element and the driven element, and having one of the gears rotationally joined with one of the drive and driven elements and the other of the gears having a frictional engagement surface joined with it, a torque element adapted to have rotational torque of drive through the transmission impressed upon it, a friction engagement unit adapted to engage frictionally with the frictional engagement surface and having related a pressure application means, a carrier supporting the friction engagement unit and its related pressure application means, and means whereby rotational torque upon the torque element is exerted through the pressure application means to frictionally engage the friction engagement unit with the frictional engagement surface and its joined gear, and a means for control to render the torque element effective or ineffective upon the pressure application means and therethrough to the friction engagement unit.

18. In a transmission means, a drive element and a driven element, a frictional surface joined with one of the drive and driven elements, a torque element adapted to have rotational torque of drive through the transmission impressed upon it, a friction engagement unit adapted to engage frictionally with the frictional engagement surface and having related a pressure application means, a carrier supporting the friction engagement unit and its related pressure application means, and means whereby rotational torque upon the torque element is exerted through the pressure application means to frictionally engage the friction engagement unit with the frictional engagement surface and its joined element.

19. In a transmission means, a drive element and a driven element, transmission sets each adapted to form driving engagement between the drive and driven elements, frictional engagement elements each adapted to apply friction engagement to transmission elements, and means for causing the frictional engaging elements to be applied, comprising a selector means movable axially of the frictional engaging elements to selecting positions and having torque applying relation to the driving train, and a control means.

20. In a transmission means, a drive element and a driven element, a torque element rotationally joined with one of the drive and driven elements, transmission sets each adapted to transmit drive between the drive and driven elements, a frictional engagement surface associated with each transmission set, a carrier supporting frictional engagement means in units each adapted to engage frictionally with a related one of the friction engagement surfaces and supporting pressure application means, means whereby the rotational torque upon the torque element exerts application pressure on the frictional engagement means through the pressure application means, and means controlling the application of torque thereby from the torque element to a selected frictional engagement surface.

In witness whereof I have hereunto set my hand this 27th day of April, 1928.

ADOLPHE C. PETERSON.